Nov. 22, 1966  R. K. SMYTH  3,287,615
SELF-ADAPTIVE CONTROL APPARATUS
Filed Oct. 1, 1963  4 Sheets-Sheet 1

INVENTOR.
RICHARD K. SMYTH
BY
ATTORNEY

INVENTOR.
RICHARD K. SMYTH
BY
ATTORNEY

INVENTOR.
RICHARD K. SMYTH

United States Patent Office 3,287,615
Patented Nov. 22, 1966

3,287,615
SELF-ADAPTIVE CONTROL APPARATUS
Richard K. Smyth, Fullerton, Calif., assignor to
North American Aviation, Inc.
Filed Oct. 1, 1963, Ser. No. 313,105
8 Claims. (Cl. 318—28)

The subject of this invention relates to self adaptive control means, and more particularly to automatic means for compensating for variations in the dynamic response of a controlled element.

In the design of control systems, it is frequently desirable to maintain a fixed response characteristic or fixed relationship between the system output and input. Such characteristic relationship between the output and input of a system is variously referred to as the transfer function or frequency response of the system.

One reason for desiring a fixed frequency response characteristic for a control system is the ease of training an operator to use the system. Where the characteristic response or handling characteristics of the system are fixed, then the human operator may more readily learn how to deal with the handling characteristics of the control system, in operating and employing the system for its intended application. Another related reason for desiring fixed handling qualities is that certain types of handling qualities or control system frequency response characteristics are preferred by human operators, whereby improved task performance is achieved with less fatigue or discomfort to the human operator. Hence, if the system frequency response characteristics can be maintained at such preferred response characteristic, then the resultant improved matching of the man-machine combination provides improved performance of the man-machine combination.

The response characteristics of a control system are determined by the several response characteristics of the system controller and the controlled element. For example, a flight control system is comprised of the flight controller device and the aircraft or controlled vehicle, both of which have a transfer function or normalized response characteristics.

The two basic elements of the system, the controller and controlled element, may be operated in open-loop or in closed loop fashion, as desired. The frequency response of the controller generally is considered to be invariant with changes in time or in the environment in which the system is operated. However, the dynamics or frequency response of the controlled element frequently vary considerably as a function of variations in the utilizing environment in which the system is employed.

For example, the dynamics of a high performance aircraft may vary quite widely over a wide range of combination of speed and altitude. Various rigid-body flight path motion modes may change in both nature and in break-frequency (e.g., characteristic frequency). Further, as vehicle speed decreases and altitude increases, the gain or static ratio of vehicle response to system input decreases. Moreover, in a closed loop aircraft control system such decrease in gain and such change in dynamic response may cause the system to become dangerously unstable, as to be beyond the dynamic ability of the pilot to control and stabilize the vehicle system, thereby endangering the safety of the pilot.

In prior art control systems, air data sensors have been employed in conjunction with flight controllers and the like for adjusting the gains of the controller so as to compensate for such change in airframe performance as a function of flight condition. However, the use of such devices assume an accurate knowledge of the aircraft response to changes in airspeed and pressure altitude, which information is not necessarily accurately known. Further, such devices do not take into account the effects of changes in weight and deight distribution (due to expenditure of fuel and ammunition) in combination with air data effects.

In other words, such air data compensation means does not expressly control the dynamics of the vehicle system to a desired set of dynamics. Instead, such air data means adjusts the system dynamics in an open-loop fashion as a function of sensed air data conditions (e.g., airspeed and pressure altitude).

One means of attempting to compensate for the variation and reduction of vehicle response as the airborne vehicle changes flight conditions and approaches increasingly rarefied atmospheres has been the use of self-adaptive control systems which seek to increase the effective gain of the controller to a maximum amount, above which the control system tends to become unstable. Such amplitude-sensitive adaptive systems tend to maintain the gain at a maximum. However, the closed-loop control system break-frequency (e.g., the maximum speed of response of the closed loop system) and the associated damping characteristics may vary considerably as the flight condition varies. Hence, the control system dynamics are not maintained at a preselected, preferred, set of dynamics.

One means of attempting to maintain a preferred dynamic response in a system of variable dynamics has been the use of a closed loop control system in which the feed back loop contains an electrical analog or fixed network having a fixed transfer function which is the inverse of the desired transfer function, and further employing the maximum gain device described above. If the gain can be maintained sufficiently high, then the closed loop response of the system can be demonstrated, by well-known servo theory, to approximate the desired transfer function.

A disadvantage of such means for achieving a desired transfer function is that the gain of the system cannot always be maintained as high as is theoretically required, and that such interim gains as can be achieved may result in an unstable or limit-cycling system.

Accordingly, a broad object of the invention is to provide improved means for providing relatively fixed system dynamics for a control system comprising a controlled element having varying dynamics.

In a preferred embodiment of the subject invention there is provided a control system having a controller and a controlled element. There is also provided means for compensating for variations in the response characteristics of the controlled element comprising a source of selected signals to be coupled to the input of the controller. There is further provided filter means responsive to that component of a sensed output of the controlled element corresponding to the input from the source of selected signals. Gain control means is responsively connected to the filter and the source of selected signals for adjusting the gain of the controller; and control means is similarly connected to the source of selected signals and filter for adjusting the response of the controller. In the preferred embodiment shown herein, the source of selected signals provides a fixed frequency signal, the filter is a narrow band-pass filter (at the frequency of the fixed frequency signal).

In normal operation in one embodiment the amplitude and phase response of the controlled element at the frequency of the fixed frequency source is measured. Such responses are then compared to response references, and any deviations therefrom are corrected by means of the combined effects of the gain and frequency-sensitive response adjusting means. The frequency-sensitive response adjusting means adjusts the phase-angle response of the system so as to reduce the deviation from a reference phase-shift. However, such adjustment also effects the amplitude response of the system at the reference frequency. Accordingly, the action of the gain adjusting means provides whatever additional amplitude response adjustment is required, by adjusting the static gain of the control system. In this way, the static gain adjusting means and frequency-sensitive response adjusting means cooperate to assure a control system of fixed dynamics, thereby compensating for variations in the dynamics of the controlled element.

By preselecting the desired phase and gain reference for the class of controlled element involved, then the relatively fixed dynamics of the system can be preselected to approach those of a preferred dynamic model. The normal operation of the above described arrangement does not require the continuous maintenance of highest possible gains over all operating conditions of the controlled element and therefore does not suffer from the disadvantages of the so-called "inverted dynamic model" system for achieving a preferred dynamic model.

Accordingly, it is an object of the subject invention to provide improved means for controlling a controlled element.

It is another object of the subject invention to provide control means for controlling a controlled element having variable dynamics.

It is still another object of the subject invention to provide means for compensating for variations in the dynamics of a controlled element.

It is yet another object of the subject invention to provide a control system having substantially fixed dynamics.

It is a further object of the invention to control the dynamics of a control system as a function of the sensed response of a controlled element having variable dynamics.

These and other objects of the invention will become apparent from the following specification taken together with the accompanying drawings in which.

Figure 1:
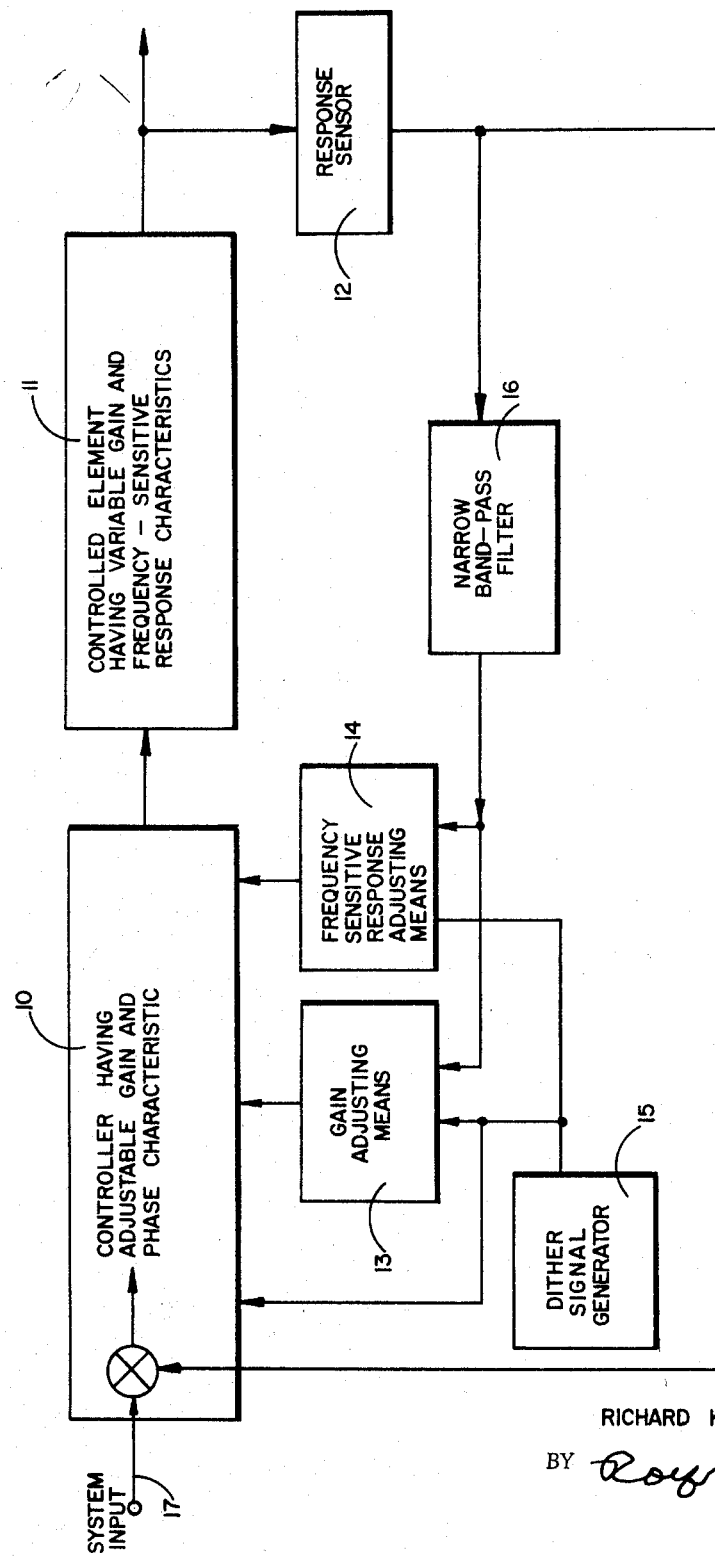
FIG. 1 is a block diagram of a system embodying a concept of the invention.

Referring to FIG. 1, there is illustrated a block diagram of a system embodying a concept of the invention. There is provided a closed loop control system comprising a controller 10 having adjustable gain and phase (or frequency-sensitive response) characteristics, in driving relationship to a controlled element 11 having variable gain and frequency-sensitive response characteristics. The output or response of controlled element 11 is sensed by a response sensor 12 and fed back to controller 10 which compares the sensed response with an input or analog signal of a desired response, and controls controlled element 11 in accordance with the sense of the difference therebetween. Hence, the magnitude of such difference tends to be reduced, as is well understood in the art of closed loop control devices. Controlled element 11 may be comprised of an aircraft or other vehicle to be controlled and controller 10 may be comprised of an electronic flight attitude stabilizer or like means well-known in the art. Sensor 12 may be comprised of an attitude rate gyro mounted on the controlled aircraft or like vehicle response sensing means well known in the art. Accordingly, elements 10, 11 and 12 are shown in block form only.

There is also provided means 13 for adjusting the gain of controller 10 and means 14 for adjusting the frequency sensitive response characteristics of controller 10. Gain adjusting means 13 might be comprised of a positional servo system arranged in driving relationship with a gain potentiometer or like means for adjusting the gain of an electrical or electromechanical controller. Frequency-sensitive response adjusting means 14 might be comprised of a positional servo in driving relationship with an adjustable impedance of a frequency-sensitive network of electrical controller 10. Accordingly, elements 13 and 14 are shown in block form only.

A test signal generator 15 is connected to provide an input signal of a preselected frequency to controller 10, and a narrow band-pass filter 16 is connected to sensor 12 in order to provide a component of the sensed response signal corresponding to that component of the system input provided by generator 15. Generator 15 may be comprised of a fixed frequency oscillator or like means known in the art for generating a periodic signal. The signal frequency of generator 15 is preferably selected to be one beyond or slightly higher than that break-frequency representing a desired speed of response of the system of FIG. 1. In this way, undesired components of the output response of element 11 which are uncorrelated with the input from input line 17 are minimized. In other words, the system response to the test signal is minimized.

The narrow band pass filter 16 has a center frequency (of the band-pass) substantially equal to the fixed frequency of the test signal generator 15. The combination of a test signal frequency (beyond the normal frequency region of the system response) and the limited system input spectra assure that the output resulting from the band-pass of filter 16 is essentially correlative only with the input from generator 15. Any response to any random appearing control inputs occurring within such band-pass about the test signal frequency will be attenuated due to the integrating action of the servo motors employed in the gain and phase adjusting means 13 and 14 (to be described more fully hereinafter).

Gain adjusting means 13 is responsively connected to the respective outputs of generator 15 and filter 16 to adjust the gain of controller 10 in accordance with the sense of the amplitude differences therebetween so as to reduce the magnitude of such difference. Phase-adjusting means 14 is also responsively connected to generator 15 and filter 16 to adjust the frequency sensitive response of controller 10 in accordance with the sense of the deviation of the phase-shift response of the system relative to a preselected or reference time-phase (at the test frequency), so as to reduce the magnitude of the deviation.

Figure 2:
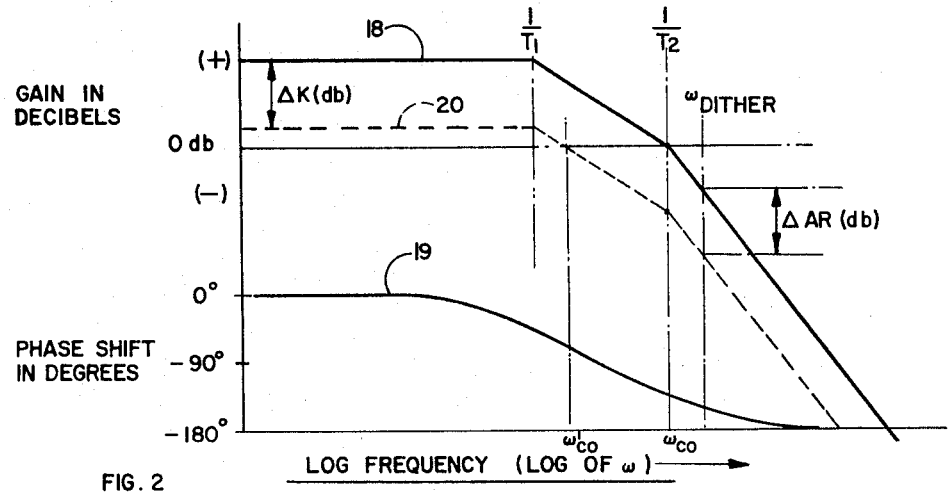
FIGS. 2, 3 and 4 are frequency-response diagrams illustrating several types of changes to an exemplary dynamic model of the controlled element of FIG. 1.
Figure 3:
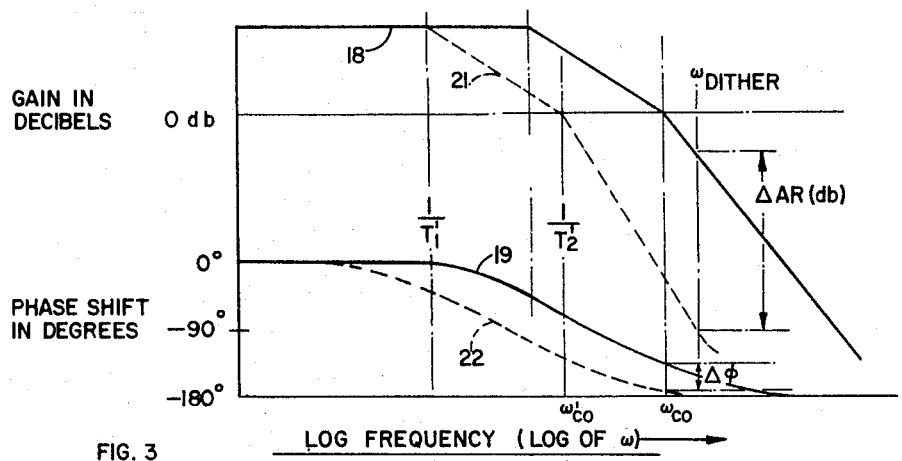
Figure 4:
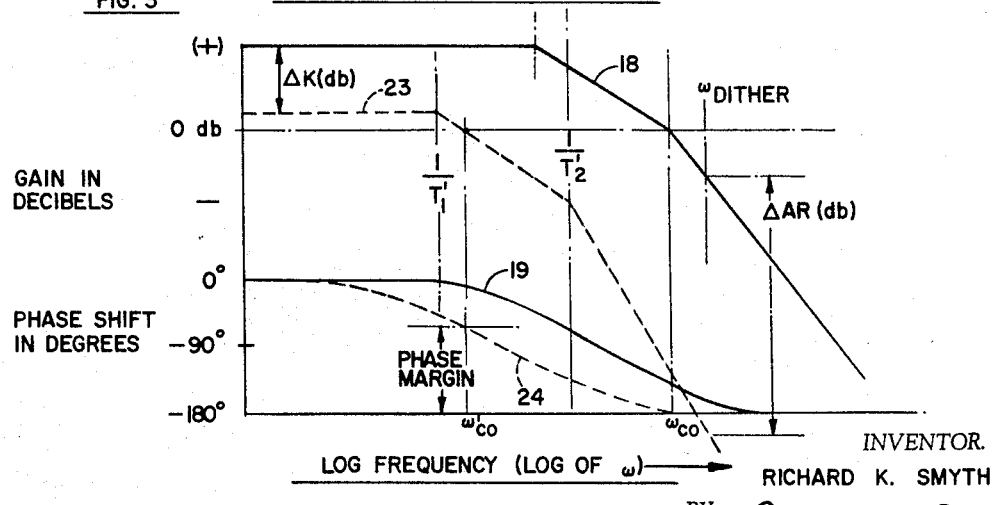

The normal operation of the device of FIG. 1 may be appreciated by reference to FIGS. 2, 3, and 4.

Referring to FIGS. 2, 3, and 4, there are illustrated frequency-response diagrams of several types of changes to an exemplary dynamic model of the controlled element of FIG. 1. Curves 18 and 19 in FIGS. 2, 3, and 4 represent a nominal, or even preferred, model of the open-loop dynamics of the system of FIG. 1, and having a first and second characteristic break-frequency at $1/T_1$ and $1/T_2$ respectively. The crossover of the 0 db line by amplitude ratio curve 18 at the crossover frequency $\omega_{co}$ approximates the first break frequency or speed of response of the *closed loop* response. Such approximation may be appreciated from the expression of the closed loop transfer function ($KG_{CL}$) in terms of the open-loop transfer function ($KG_{OL}$). For those frequencies ($\omega < \omega_{co}$) for which $KG_{OL} > 1$ (e.g., above 0 db):

$$KG_{CL} = \frac{KG_{OL}}{1 + KG_{OL}} \approx 1.0 \qquad (1)$$

For those frequencies for which $KG_{OL} < 1$ (e.g., below 0 db):

$$KG_{CL} = \frac{KG_{OL}}{1 + KG_{OL}} \approx KG_{OL} \qquad (2)$$

Curve 20 in FIG. 2 represents the open-loop amplitude response of the system of FIG. 1, where the static gain (or zero frequency gain) is reduced. No change occurs to the phase-shift response associated with such gain change. Accordingly, phase angle curve 19 also represents the phase response associated with amplitude ratio curve 20.

It is to be observed from the intersection of the 0 db line by amplitude response curves 18 and 20, that the crossover frequency $\omega_{co}$ has been reduced to $\omega'_{co}$, indicating that the resultant closed loop speed of response will be reduced. Further, the phase margin (difference between $-180°$ and the phase shift at $\omega'_{co}$) indicated by curve 18 is so high as to predict an overdamped or sluggish response of the slower, closed-loop system.

Because no change in the phase response is observed (at the test frequency) in the alternate dynamic model (curve 19, together with curve 20) no adjustment in the phase response characteristic of the controller 10 in FIG. 1 would be required or provided. However, the reduction in the amplitude ratio (AR) response observed at the test signal frequency would cause the gain adjustment means 13 of FIG. 1 to adjust the static gain of controller 10 so as to restore the desired open-loop gain (e.g., reduce the AR response difference at the test signal frequency to zero).

Curves 21 and 22 in FIG. 3 represent the open loop amplitude ratio and phase shift responses respectively of a controlled element whose dynamic response characteristics are slower than those of the model (represented by curves 18 and 19). Such slower open-loop dynamics are indicated by the lower frequencies at which the break frequencies $1/T_{1'}$ and $1/T_{2'}$ occur, relative to $1/T_1$ and $1/T_2$, respectively.

Such lower frequency dynamic modes cause the amplitude curve 21 to demonstrate a lower crossover frequency ($\omega'_{co}$) relative to that ($\omega_{co}$) of the nominal model, thereby predicting a slower closed loop speed of response. Such condition is manifested *at the test frequency* by the lesser amplitude of the AR curve 21 relative to the nominal AR curve 18; and by the increase in negative phase of curve 22 relative to the nominal phase curve 19.

The increase in the negative phase shift response observed at the test signal frequency would cause phase-adjusting means 14 of FIG. 1 to adjust the frequency-sensitive responsive of controller 10 so as to restore the desired phase-shift response (e.g., reduce the deviation in phase shift ($\Delta \phi$) at the test signal frequency). Associated with such adjustment of the test frequency phase shift is an associated change (increase) in the frequency sensitive amplitude response of controller 10, as to compensate for the reduced amplitude ratio response of controller element 11 observed at the test frequency. Any remaining difference in the combined amplitude response of elements 10 and 11 at the test frequency would then be adjusted or compensated for by the cooperation of gain-adjusting means 13, as required, as explained in connection with FIG. 2.

Curves 23 and 24 in FIG. 4 represent the open-loop frequency response of a controlled element whose static gain is reduced and whose dynamic response characteristics are slower, relative to the nominal model represented by curves 18 and 19. In other words, amplitude ratio response curve 23 and associated phase response curve 24 combine the respective gain and frequency-sensitive effects severally described in FIGS. 2 and 3, respectively. Amplitude ratio response curve 23 demonstrates a lower crossover frequency ($\omega'_{co}$) relative to that of curve 18 of the nominal model, thereby predicting very slow closed loop speeds of response. Further, phase curve 24 exhibits a much larger phase margin at the associated crossover frequency ($\omega'_{co}$) than the nominal phase-curve 19 does at the crossover frequency ($\omega_{co}$) of the associated nominal AR curve 18, thereby predicting an overdamped sluggish system response. However, the negative phase-shift of curve 24 at the *test signal frequency* ($\omega_d$) is greater, relative to that of curve 19. Accordingly, elements 13 and 14 of FIG. 1 will cooperate as described in connection with the description of FIG. 3, to increase the static (or zero frequency) gain and to improve the frequency-sensitive response, whereby the amplitude and phase response deviations at the test frequency are reduced.

Hence, it is to be appreciated that the arrangement of FIG. 1 provides means for compensating for variations in the gain and dynamics of a controlled element, whereby closed-loop control system performance of substantially fixed dynamics is achieved. Further, such performance does not rely upon driving a controlled element at a maximum possible gain, as may be more easily seen from the embodiment shown in FIG. 5.

Figure 5:
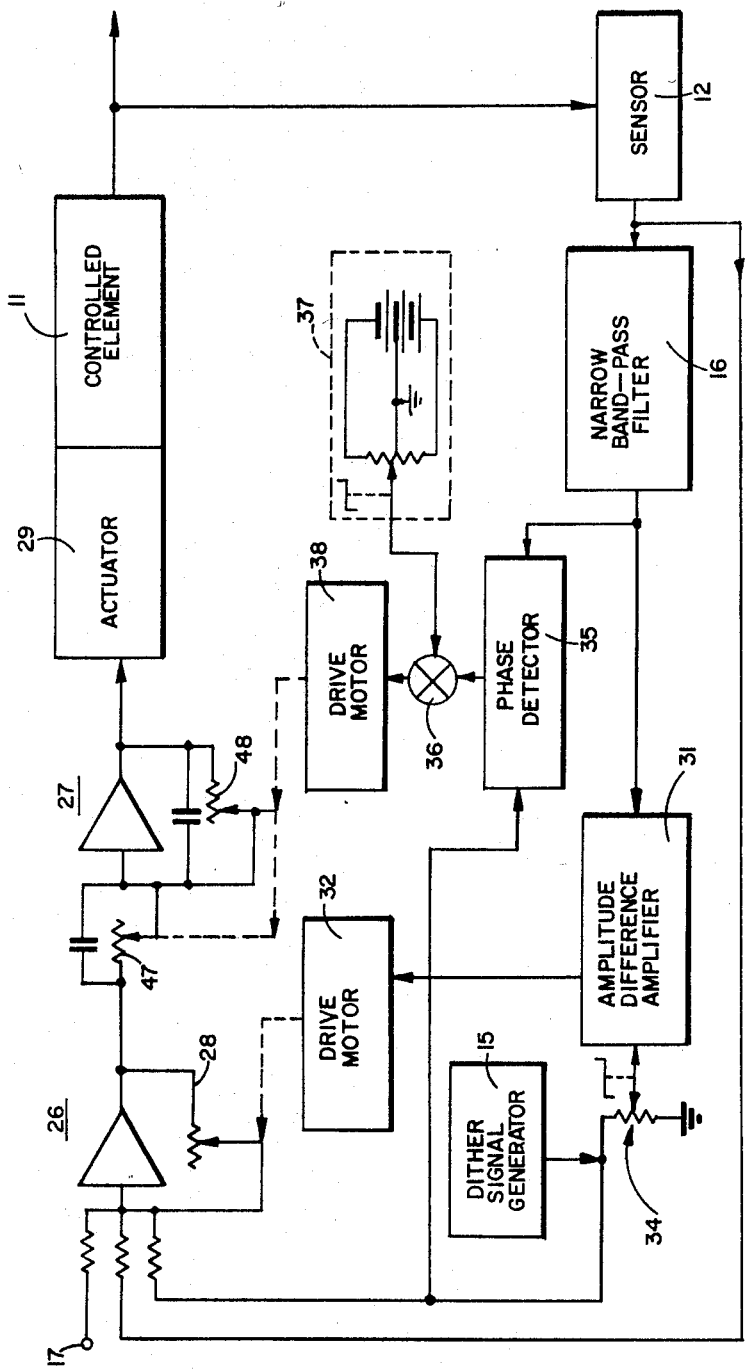
FIG. 5 is a detailed block diagram of the device of FIG. 1, showing an exemplary embodiment of the invention.

Referring to FIG. 5, there is illustrated a preferred embodiment of the device of FIG. 1. There is provided a controlled element 11, feedback sensor 12, dither signal generator 15, and narrow band pass filter 16 arranged to cooperate similarly as like referenced elements of FIG. 1. There is also provided a phase-inverting amplifier 26 employed as a negative-feedback summing amplifier. The output of sensor 12 is fed back to the input summing network of amplifier 26 in such a sense as to oppose an input applied at system input terminal 17, so that the combination of FIG. 5 comprises a closed loop control system, as is well understood in the art. The feedback impedance 28 of feedback amplifier 26 is adjustable, whereby the gain thereof may be conveniently adjusted, for reasons which will subsequently become more fully apparent.

An electrically controlled actuator 29 or position servo cooperates with controlled element 11, to effect control thereof in response to electrical signals applied to the input of actuator 29. Interconnecting the input of actuator 29 and the output of amplifier 26 is a second negative feedback amplifier stage 27, having frequency-sensitive input and feedback impedance network. The frequency response characteristics of frequency sensitive amplifier 27 may be adjusted by means of the adjustable impedances in the frequency-sensitive networks in the input and feedback of amplifier. Hence, it is to be appreciated that amplifiers 26 and 27 together with actuator 29 comprise the controller 10 (FIG. 1) having adjustable gain and phase characteristics.

The input and feedback impedance network of amplifier 27 each comprise a fixed capacitor and adjustable resistance in parallel, although a variable capacitor and fixed resistance could be similarly employed. Further, it is to be observed from FIG. 5, that the adjustable resistances are mutually ganged as to be oppositely adjusted. In other words, moving the wiper of the feedback resistor 48 in FIG. 5 to the left as to increase the effective feedback resistance, also moves the wiper of input resistor 47 to the left decreasing the effective input resistance. Hence, the adjustment of the ganged adjustable resistors 47 and 48 of amplifier 27 serves to increase the time constant of one of the frequency sensitive input and feedback impedance networks, while decreasing the time-constant of the other of the two impedance networks.

Phase-sensitive amplitude detection means 31 such as a difference amplifier is responsively connected to the respective outputs of signal generator 15 and filter 16 for providing a gain control signal indicative of the difference therebetween. The output of amplifier 31 is fed to a first generating drive means such as a motor 32, the output shaft of which is connected to drive variable feedback resistor 28, whereby the gain of amplifier 26 is adjusted so as to change the gain of the system output in such a sense as to reduce the amplitude difference between the respective inputs to amplifier 31. A potentiometer 34 may be interposed at either of the inputs to amplifier 31 to adjust or preselect a reference gain (corresponding to the nominal amplitude ratio at the dither frequency of curve 18 in FIG. 2). Should the amplitude of the output of dither signal generator 15 vary, the output of filter 16 will tend to vary correspondingly. Hence, by using the attenuated output of generator 15 (as supplied by potentiometer 34) as a gain reference, problems of calibration drift and voltage regulation are minimized.

Phase detection means 35 is operatively connected to the respective outputs of generator 15 and filter 16 for providing a signal indicative of the time-phase difference therebetween. The output of phase detector 35 is compared at difference amplifier 36 with the output of a phase reference signal source 37 (corresponding to the nominal phase shift at the dither frequency of curve 19 in FIG. 2). The output of difference amplifier 36 is fed to a second drive motor 38, the output shaft of which is connected to drive variable input resistor 47 and variable feedback resistor 48. In this way, the frequency-sensitive phase-shift and the associated frequency sensitive gain of amplifier 27 are adjusted, the phase-shift being adjusted in such a sense as to reduce the amplitude difference between the system phase shift (indicated by the output of phase detector 34) and the phase reference analog 37.

That the adjustment of feedback resistor 28 of negative feedback amplifier 26 adjusts the gain of such amplifier, is well understood in the art. For example, the discussion at pages 12–14 of "Electronic Analog Computers" by Korn and Korn (Second Edition) published by McGraw-Hill (1956), indicates that the gain of a high-gain negative feedback amplifier to a given input is determined by the ratio of the feedback impedance to the input impedance associated with such input. Hence, it is to be appreciated that the gain of amplifier 26 (in FIG. 5) varies directly with the adjustment of variable resistor 28.

Similarly, the transfer function $KG(S)$ or frequency response characteristic of amplifier 27 (in FIG. 5) is described by the ratio of the feedback impedance ($Z_f$) to the input impedance ($Z_i$):

$$KG_{(S)} = \frac{Z_f}{Z_a} \quad (3)$$

now:

$$Z_i = \frac{R_i \frac{1}{C_i S}}{R_i + \frac{1}{C_i S}} = \frac{R_i}{(R_i C_i S + 1)} \quad (4)$$

and:

$$Z_f = \frac{R_f \frac{1}{C_f S}}{R_f + \frac{1}{C_f S}} = \frac{R_f}{R_f C_f S + 1} \quad (5)$$

Therefore:

$$KG_{(S)} = \frac{R_f(R_i C_i S + 1)}{R_i(R_f C_f S + 1)} \quad (6)$$

It is to be appreciated from Equation 6 that the first order R-C time constant of the input impedance network of amplifier 27 (in FIG. 5) determines a zero or lead-term or frequency-sensitive numerator term of the transfer function of amplifier 27, and that the time constant of the feedback impedance similarly determines a pole or lag-term or frequency-sensitive denominator term of the transfer function. Hence, it is to be appreciated that the adjustment of either of the parameters determining such time-constant (e.g., adjustment of either of the resistance and capacitance of the impedance network) will thus adjust the respective pole or zero represented by such network.

Further, the arrangement of amplifier 27, is an analog of a transfer function having at least one pole and one zero, each of which is adjustable. Moreover, the adjustable input and feedback resistors of amplifier 27, being ganged as to be oppositely adjusted by the common adjusting means 38, an incremental adjustment of one sense increases the numerator time constant and decreases the denominator time constant; an adjustment of opposite sense serving to decrease the numerator time constant and increase the denominator time constant. Where, of course, the numerator and denominator time constants are adjusted to be equal, then the phase-shift contributed by amplifier 27 is substantially zero within the bandwidth of the amplifier response, and the static gain thereof is represented by the ratio of the feedback resistance to the input resistance.

Figure 6:
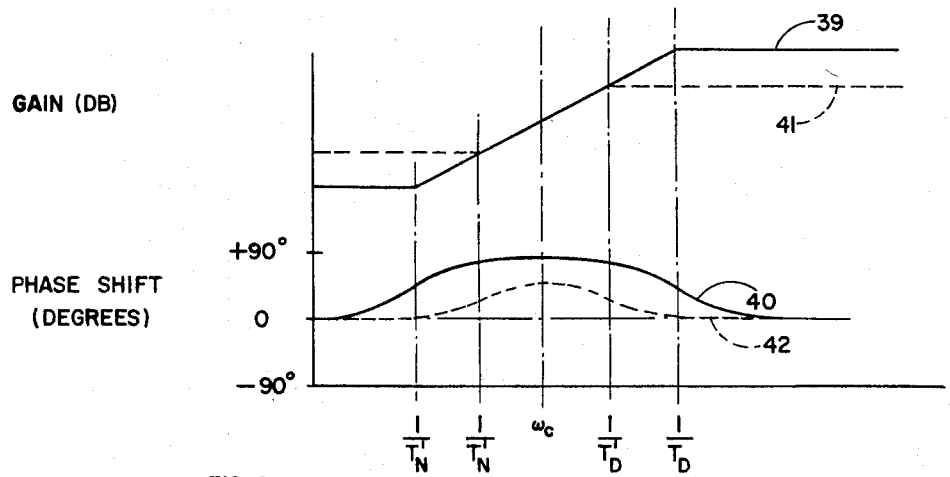
FIGS. 6 and 7 are frequency-response diagrams illustrating exemplary responses of the frequency-sensitive amplifier 27 of FIG. 5.
Figure 7:
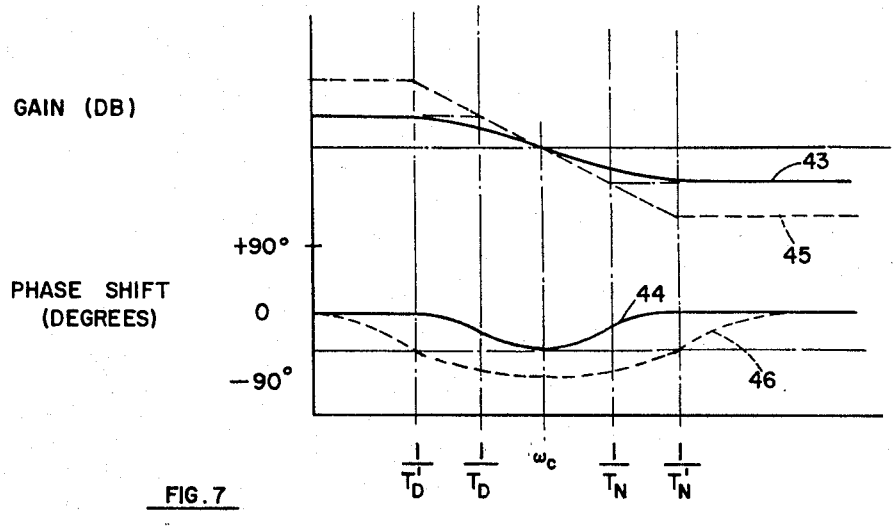

FIGS. 6 and 7 illustrate response characteristics of amplifier 27 for several adjustments of the input and feedback impedances thereof.

Where the numerator time constant ($T_N$) is larger than the denominator time constant ($T_D$), as shown in the amplitude versus frequency response curve 39 of FIG. 6 (e.g., $1/T_N$ is less than $1/T_D$), then the transfer function described by Equation 6 for amplifier 27 (of FIG. 5) is a lead-lag network, having a positive phase shift characteristic, illustrated by phase response curve 40 in FIG. 6. The extent of the positive phase shift provided by such transfer function or characteristic of amplifier 27 decreases as the difference between $1/T_N$ and $1/T_D$ decreases (e.g., $1/T_N$ increased to $1/T_{N'}$, $1/T_D$ decreased to $1/T_{D'}$ in FIG. 6), as shown by phase response curve 42 in FIG. 6.

Similarly, where the numerator time constant ($T_N$) is smaller than the denominator time constant ($T_D$), as shown in FIG. 7 (e.g., $1/T_N > 1/T_D$), then the transfer function of amplifier 27 is a lag-lead network, having a negative phase shift characteristic, illustrated by phase-response curve 44 in FIG. 7. The extent of the negative phase shift provided by such transfer function increases as the difference between $1/T_D$ and $1/T_N$ increases (e.g., $1/T_N$ increased to $1/T_{N'}$ and $1/T_D$ decreased to $1/T_{D'}$ in FIG. 7).

Hence, it is to be appreciated that adjustable amplifier 27 provides an analog of a transfer function having at least one pole and one zero, which are mutually adjustable about a center frequency which may be selected to correspond to the nominal crossover frequency, ($\omega_{co}$, of FIGS. 2, 3, and 4). Such adjustment by means of the cooperation of elements 35, 36, 37, and 38 with the system of FIG. 5 provides a compensatory frequency-sensitive response which tends to compensate for changes in the frequency-sensitive response of controlled element 11. Such compensatory frequency response coupled with the compensatory gain adjustment of amplifier 26 (provided by the cooperation of elements 31 and 32 with the system of FIG. 5, as explained above), provides a constant phase and amplitude response at the test signal frequency, which response tends to assume a closed-loop system performance of fixed or preselected dynamics within the response bandwidth of interest.

Accordingly, improved means have been described for controlling the dynamics of a control system, whereby a preferred or desired dynamic performance may be provided. Such described means compensates for variations in the dynamics of a controlled element as a closed-loop function of the performance of the controlled element, rather than as an open-loop function of the operational environment, and is therefore more accurate. Further, the compensator means does not rely upon maximum system gains to provide such desired dynamic model, and is therefore operationally safer in the event of system malfunction.

Where a greater degree of frequency-sensitive compensation is required, an additional amplifying stage similar to the combination of stage 27 (in FIG. 5) may be placed in cascade therewith and similarly ganged to the output of motor 38. Alternatively, higher order poles and zeros may be analoged by substituting variable inductances for resistors 47 and 48 in amplifier 27.

Although the invention has been described and illustrated in detail, it is to be clearly understood that the same is by way of illustration and example only and is not to be taken by way of limitation, the spirit and scope of this invention being limited only by the terms of the appended claims.

I claim:
1. In a control system having a controller and a controlled element,
　　means for compensating for variations in the response characteristics of said controlled element, comprising:
　　　　a source of fixed frequency input signals coupled to the input of said controller;
　　　　a narrow band-pass filter responsive to that component of a sensed output of said controlled element corresponding to the fixed frequency input from said source;
　　　　first amplitude sensitive control means having a first and second input connected to said source and said narrow bandpass filter respectively for adjusting the gain of said system; and
　　　　second phase-sensitive control means having a first and second input connected to said source and said narrow band-pass filter respectively for oppositely adjusting a pole and zero of the frequency-sensitive response of said system.

2. In a control system having an actuator and a controlled element, means for compensating for variations in both the static and dynamic response characteristics of the controlled element, comprising:
　　a dither frequency signal generator coupled to the input of said controller to provide a test signal input to the controlled element;
　　narrow band-pass filter means responsive to that component of a sensed output of said controlled element corresponding to said dither signal input;
　　phase-sensitive detection means connected to said signal generator and said filter means for providing a first compensating signal indicative of the phase difference therebetween;
　　amplitude sensitive detection means responsively connected to said signal generator and said filter means for providing a second compensating signal indicative of the amplitude difference therebetween;
　　adjustable gain means interposed in series with said actuator;
　　adjustable frequency-sensitive response means interposed in series with said actuator; and
　　first and second adjusting means responsive to said first and second compensating signals respectively for adjusting respective ones of said adjustable gain and frequency-sensitive response means.

3. In a control system having an actuator and a controlled element, means for compensating for variations in the dynamic response characteristics of the controlled element, comprising:
　　a dither frequency signal generator coupled to the input of said controller to provide a test signal input to the controlled element;
　　narrow band-pass filter means responsive to that component of a sensed output of said controlled element corresponding to said dither signal input;
　　phase-sensitive detection means connected to said signal generator and said filter means for providing a first compensating signal indicative of the phase difference therebetween;
　　adjustable frequency-sensitive response means interposed in series with said actuator; and
　　adjusting means responsive to said compensating signals respectively for adjusting said adjustable frequency-sensitive response means.

4. In a control system having a controlled element, means for compensating for variations in the response characteristics of the controlled element comprising:
　　a controller having an adjustable gain and adjustable frequency-sensitive response characteristics;
　　a source of fixed frequency input signals coupled to an input of said controller;
　　a narrow band-pass filter responsive to that component of a sensed output of said controlled element corresponding to the fixed frequency input from said source;
　　first means responsive to said source and said filter for adjusting the gain of said controller; and
　　second means responsive to said source and said filter for adjusting the frequency-sensitive response of said controller.

5. In a control system having an electrically controlled actuator and a controlled element, means for compensating for variations in the response characteristics of said controlled element, comprising:
　　an adjustable-gain input device interposed at the input of said actuator;
　　an operational amplifier in series with said adjustable gain element, said operational amplifier having a feedback impedance network and an input impedance network,
　　　　said networks being mutually oppositely adjustable frequency-sensitive impedance networks;
　　a source of fixed-frequency input signals coupled to an input of said controller;
　　a narrow band-pass filter having a center frequency equal to the frequency of said fixed frequency source;
　　a phase-detector responsively coupled to the outputs of said signal generator and said filter;
　　a source of a phase reference signal;
　　differential signalling means connected to said phase detector and said phase reference source for providing a phase control signal,
　　a motor responsive to said control signal and arranged for adjusting said adjustable networks.

6. The device of claim 5 in which each of said impedance networks of said operational amplifier comprise a capacitor in parallel with one of a resistor and inductor, one of said impedance elements of each of said networks being adjustable, a corresponding adjustable impedance of said input and feedback impedance networks being ganged to be mutually oppositely adjustable by a common adjusting means comprising said motor.

7. The device of claim 5 in which is further provided gain adjusting means for compensating for variations in the gains of said controlled element and said operational amplifier comprising
　　second differential signalling means responsive to the outputs of said generator and said filter for providing a gain control signal;
　　a motor responsive to said gain control signal and arranged to adjust said adjustable gain device.

8. The device of claim 5 in which is further provided gain adjusting means for compensating for variations in the gains of said controlled element and said operational amplifier comprising,
　　second differential signalling means responsive to the outputs of said generator and said filter for providing a gain control signal;

a motor responsive to said gain control signal and arranged to adjust said adjustable gain device; and a potentiometer interposed at an input to said second differential signalling means to provide an adjustable drift-free gain reference.

References Cited by the Examiner

UNITED STATES PATENTS

| | | | |
|---|---|---|---|
| 2,880,384 | 3/1959 | Surtees | 318—489 |
| 2,990,504 | 6/1961 | White | 318—28 |
| 3,096,471 | 7/1963 | Taylor | 318—448 |
| 3,105,928 | 10/1963 | Congleton et al. | 318—28 |
| 3,109,970 | 11/1963 | Smyth | 318—28 |
| 3,149,270 | 9/1964 | Smyth et al. | 318—28 |

ORIS L. RADER, *Primary Examiner.*

JOHN F. COUCH, *Examiner.*

B. DOBECK, *Assistant Examiner.*